Dec. 20, 1960 K. K. SORENSON 2,964,931
REVERSIBLE SHEAR OUTPUT SHAFT
Filed June 20, 1958 2 Sheets-Sheet 1
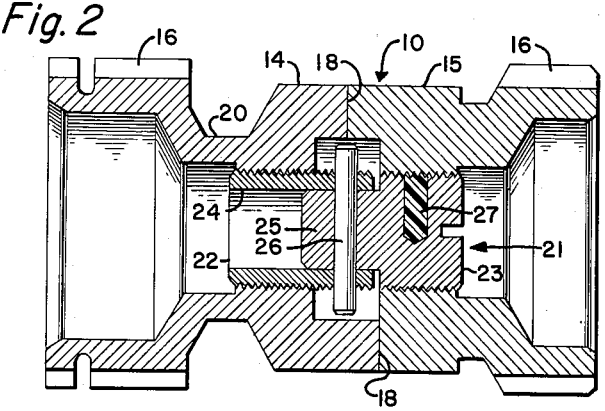
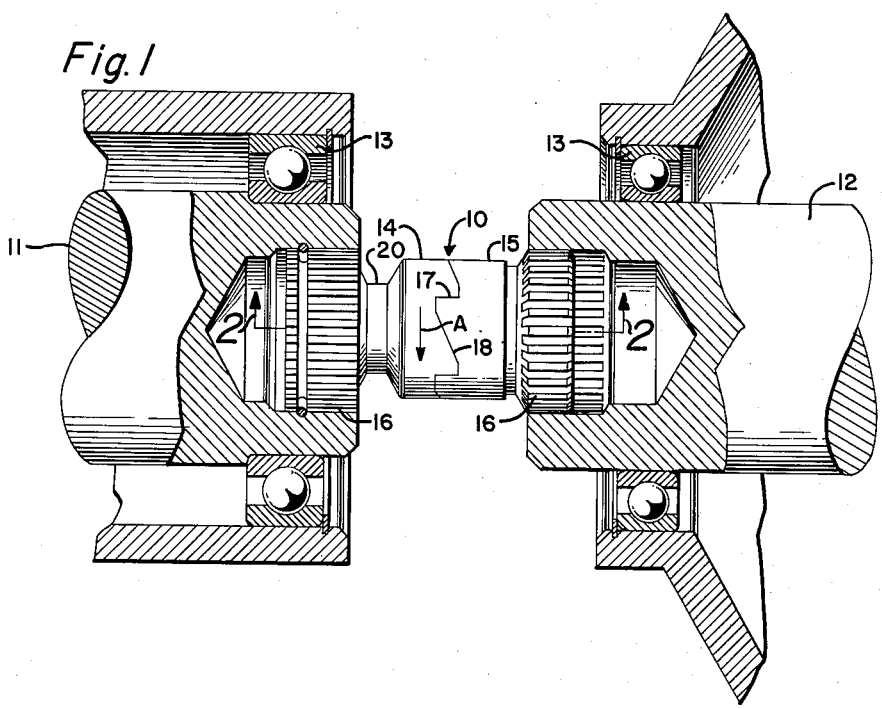
INVENTOR.
KAL K. SORENSON
BY
Herschel C. Omohundro
ATTORNEY Dec. 20, 1960  K. K. SORENSON  2,964,931
REVERSIBLE SHEAR OUTPUT SHAFT
Filed June 20, 1958  2 Sheets-Sheet 2

INVENTOR.
KAL K. SORENSON
BY
Herschel C. Omohundro
ATTORNEY

United States Patent Office 2,964,931
Patented Dec. 20, 1960

2,964,931

REVERSIBLE SHEAR OUTPUT SHAFT

Kal K. Sorenson, Phoenix, Ariz., assignor to The Garrett Corporation, Los Angeles, Calif., a corporation of California Filed June 20, 1958, Ser. No. 743,399

7 Claims. (Cl. 64—28)

This invention relates generally to couplings and is more particularly directed to a motion transmitting coupling to be employed between driving and driven members, such as a starter and an engine or turbine.

In some devices for starting main engines of aircraft or other apparatus, overrunning clutches are employed between the starting motor and the main engine. These overrunning clutches transmit motive forces from the starting motor to the main engine while the speed of the latter is below a predetermined value, and when such rate is exceeded, they permit the starter motor to operate at a lower rate or to be stopped entirely. In some instances, the parts of the overrunning clutch may fail, causing the engine to suddenly transmit torque to the starting motor, with consequent damage to either the starting motor, the engine, or both.

It is an object of this invention to provide a coupling device for use between an overrunning clutch and an engine, the coupling device being so constructed that, if a predetermined resistance to rotations encountered, the engine and starter will be uncoupled before either can be damaged.

One of the objects of this invention also is to provide a safety-type coupling which will transmit normal motive forces from a starter or similar device to the main shaft or other movable portion of an engine, and will disconnect the starter from the engine when abnormal forces occur.

Another object of the invention is to provide a motion transmitting coupling having dual safety features to protect the driving and driven members when exceptional resistance is encountered by the driving member, or when the driven member tends to impart unusual forces to the driving member, or a condition has arisen in which the application of usual forces to the latter member might cause damage to either of the members.

A further object of the invention is provide a motion transmitting coupling having dual safety features of different response rates, one protecting structure, such as a starter, against a predetermined high overload, and the other protecting other structure, such as an engine, against a damaging load; for example, the seizure of bearings or other parts in the starter following the initiation of operation of the engine.

A still further object of the invention is to provide a motion transmitting coupling having a pair of sections with interengaging portions so formed that torque applied to one will be transmitted to the other but torque transmitted to the latter will tend to separate the sections, means being provided to resist such separation until torque of a predetermined value is exerted.

Another object is to provide a motion transmitting coupling of the type set forth in the preceding paragraph modified to include a frangible portion on one of the sections which will fail and interrupt the transmission of motion in the event excessive torque is applied to the coupling.

Other objects and advantages will be apparent from the following description of the forms of the invention illustrated in detail in the accompanying drawings. In the drawings:

Figure 1 is an axial sectional view with parts in elevation, of a reversible shear output shaft or coupling, formed in accordance with the present invention, in position to transmit motion from a driving to a driven shaft;

Fig. 2 is an axial sectional view on an enlarged scale of the coupling shown in Fig. 1, the plane of the section being indicated by the line 2—2 of Fig. 1;

Figure 3:
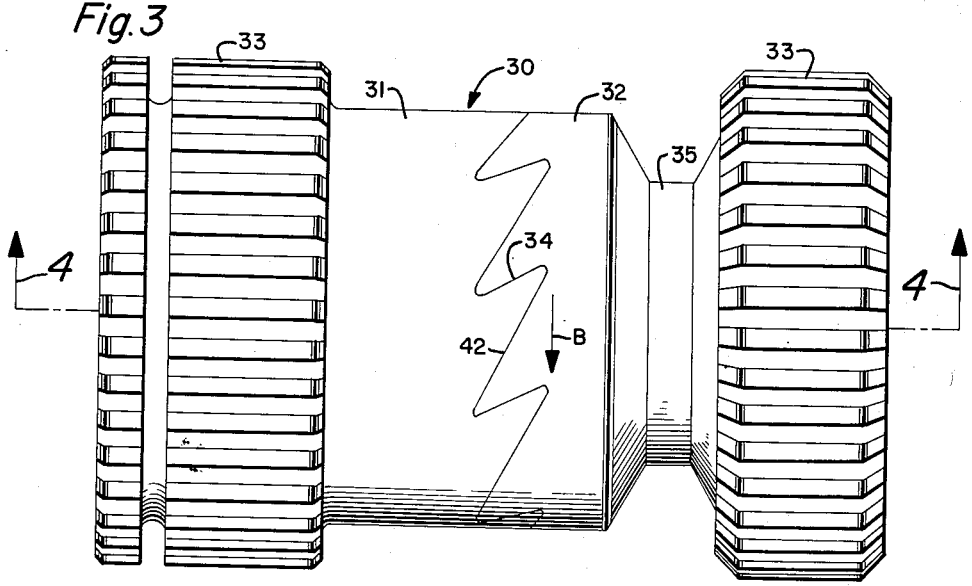
Fig. 3 is a side elevational view of a slightly modified form of coupling.

Referring more particularly to the drawings, the numeral 10 designates generally the first form of coupling illustrated. In Fig. 1 this coupling is shown in operative position to transmit motion from one shaft to another.

The foregoing objects set forth a number of uses of the coupling forming the subject matter of the invention and many more uses will be obvious to one skilled in the art. For purposes of illustration, the coupling 10 connects the ends of two shafts 11 and 12. These shafts may be of any type; for example, shaft 11 may be the driving shaft of a starter for an internal combustion engine or turbine. The shaft 12 may be the main shaft of the internal combustion engine or turbine. Both shafts are journalled for rotation in suitable bearings, such as the ball bearings illustrated at 13.

When the coupling is used between a starter and an engine, the starter shaft 11 transmits rotary motion through the coupling 10 to the shaft 12, the direction of motion being indicated in Fig. 1 by the arrow A. When a starter transmits rotary motion or torque to the shaft 12, the shaft 11 turns one part 14 of the coupling and this part transmits torque to the second part 15. In the following description these parts will be designated as sections. The sections are connected with the shafts through splines 16 or other suitable types of keys. To transmit torque from section 14 to section 15, these sections are provided with jaws 17 which so interfit that rotary motion may be transmitted in one direction only, that is, as illustrated by the arrow A, and rotary motion in the opposite direction will tend to axially separate the sections. To develop this tendency or effect such action, the jaws have inclined surfaces 18 which react upon one another when section 14 is rotated in the direction opposite that indicated by the arrow A. The effect of such motion may also be developed by the driven shaft 12 tending to drive the shaft 11 in the same direction, indicated by arrow A.

As pointed out in the objects, the coupling is designed to transmit starting torque from a starter shaft to an engine shaft or other rotating element. After the engine has started, the shaft 12 will tend to drive the shaft 11 through the coupling. In some starters, an overrunning clutch, not shown, is employed so that the shaft 11 may be driven by the shaft 12 without affecting the starter. The coupling is so constructed that this force will be transmitted, but in the event unusual resistance to torque is encountered, the coupling will shear or otherwise uncouple shaft 12 from shaft 11, or vice versa.

The coupling illustrated has a double safety feature incorporated therein. One of the sections (in this instance section 14) is provided with a reduced portion 20 designed to fracture under a predetermined torque. This reduced section may be calculated to fail under a load of, for example, 400 foot-pounds. Under ordinary operations, this section will transmit starting torque to the engine from the starter without failure, but if an unusual condition should occur which would cause a load greater than that for which the section 20 has been designed, this section will break and disconnect the starter from the engine. Both the starter and the engine will, therefore, be protected from damage.

The coupling is provided with a second safety feature in the form of a shear device designated generally by the numeral 21, this device being disposed within the coupling and tending to prevent axial separation of the sections.

In the first form of the invention illustrated, the shear device comprises a pair of threaded pieces 22 and 23, these pieces being threaded in opposite directions and serving in the nature of a turnbuckle to draw sections 14 and 15 toward one another in response to turning movement of the shear device. The threaded pieces are formed with interfitting parts, piece 22 having a bore 24 for the reception of a boss 25 formed on piece 23. The pieces 23 and 24 are provided with transverse openings to receive a shear pin 26 of predetermined shear resistance. It will be obvious that when the shear device is in place in the sections 14 and 15, axial separation of these pieces will be resisted. Turning movement of the pieces of the shear device in the sections is precluded by a suitable locking or friction member 27. It will also be obvious from an inspection of Fig. 2 that the shear pin 26 will be placed under a shearing load when a force tending to axially separate the sections 14 and 15 is applied.

It was pointed out in the objects that the second safety feature provided by the shear device 21 will protect the starter in the event unusual resistance to turning movement of the main engine shaft is exerted by the starter. If, for example, the overrunning clutch should fail or bearings seize, the starter might be damaged through the transmission of torque thereto by the main engine shaft. When the shear device 21 is provided, however, the shear pin 26 will fail, permitting the coupling sections 14 and 15 to move axially and interrupt the transmission of motion from the main engine shaft to the starter shaft. The resistance offered by the shear pin may be slight compared to that offered by the section 20; for example, pin 26 may be designed to shear at 20 foot-pounds. In such instance, a very slight resistance to turning movement exerted by the starter will cause the pin 26 to shear and permit the coupling to be rendered incapable of transmitting torque. The starter will thus be protected. After the pin 26 has sheared, a new pin may be installed with little difficulty. The device will then be in condition for the next operation.

Figure 4:
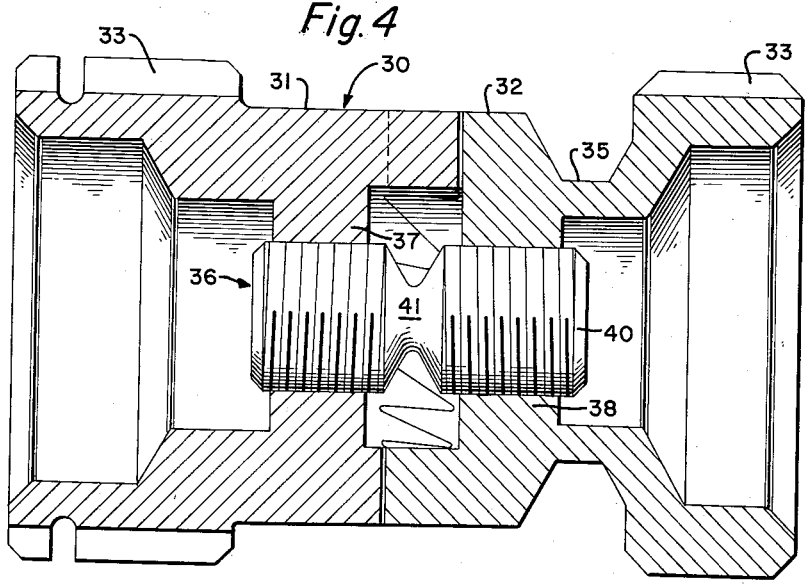
Fig. 4 is an axial sectional view of the modified form of coupling, taken on the plane indicated by the line 4—4 of Fig. 3.

In Figs. 3 and 4, a modified form of coupling 30 has been illustrated. The coupling 30 is similar to the coupling 10 in that it is provided with a pair of sections 31 and 32, these sections having splined end portions 33 for connection with driving and driven elements. The jaw teeth 34 are of slightly different shape but are designed to transmit rotary motion or torque from section 32 to section 31 in one direction, indicated by the arrow B, and to tend to separate in an axial direction in response to section 31 tending to transmit rotary motion in the same direction to section 32. One of the sections, namely, section 32, is provided with a reduced portion 35, which is designed to shear or otherwise fail under a relatively heavy load. The reduced portion 35 corresponds to the reduced portion 20 in the first form of the invention described.

The coupling 30 is also provided with a second safety or shear device designated generally by the numeral 36. This device is also disposed within the coupling and includes threaded openings formed in webs 37 and 38 provided in sections 31 and 32, the shear portion also including a coupling screw 40 which has a reduced portion 41 intermediate its length. The end portions of the screw are threaded in opposite directions in the same manner as the pieces 22 and 23 of the shear member in the first form of the invention. The screw 40 serves as a turnbuckle to draw the sections 31 and 32 together with the jaw teeth 34 in motion transmitting engagement.

It will be noted that the jaw teeth 34 have inclined portions 42 which serve, when section 31 tends to rotate section 32 in the direction indicated by the arrow B, to transmit axial separating forces to the sections. When these axial separation forces are below a predetermined value, motion will be transmitted from one coupling section to the other. If the force should increase, however, the inclined surfaces 42 will react upon one another to tend to axially separate the sections, and portion 41 of the screw 40 will be placed under sufficient tension to cause its separation. Sections 31 and 32 will then be uncoupled and incapable of transmitting rotary motion from one to the other.

In both forms of coupling illustrated, the replacement of a simple, small part (the shear pin 26 in the first form of the invention and the screw 40 in the second form of the invention) will restore the couplings to their operative condition. It will be obvious that the parts which fail under slight load will be inexpensive to manufacture and may be easily replaced.

I claim:

1. A rotary shaft coupling comprising: a pair of sections formed for connection with driving and driven units to transmit motion from the former to the latter, one of said sections having a frangible portion designed to fail under predetermined load; interengaging means on said sections operative to transmit rotary motion from one section to the other when torque in one direction is applied to one section and to tend to cause relative axial separation when torque in the same direction is applied to the other section; and an element connected with said sections and tending to prevent axial separation thereof, said element having a portion designed to fail under a predetermined load differing from the first-mentioned predetermined load.

2. A rotary shaft coupling comprising: a pair of sections formed for connection with driving and driven units to transmit motion with the former to the latter; interengaging means on said sections operative to transmit rotary motion from one to the other when torque in one direction is applied to one section and to tend to cause relative axial separation when torque in the same direction is applied to the other section; and an element secured to said sections with left- and right-hand threads, said element serving to initially draw said sections together and tending to resist axial separation of the sections, said element having a portion designed to fail under predetermined load.

3. A rotary shaft coupling comprising: a pair of sections formed for connection with driving and driven units to transmit motion from the former to the latter; interengaging means on said sections operative to transmit rotary motion from one to the other when torque in one direction is applied to one section and to tend to cause relative axial separation when torque in the same direction is applied to the other section; a pair of elements secured to said sections, said elements having interfitting portions; and a member extending through said interfitting portions to resist axial separation of said first-mentioned sections, said member being designed to shear under predetermined load.

4. A rotary shaft coupling comprising: a pair of sections formed for connection with driving and driven units to transmit motion from the former to the latter, one of said sections having a frangible portion designed to fail under predetermined load; interengaging means on said sections operative to transmit rotary motion from one to the other when torque in one direction is applied to one section and to tend to cause relative axial separation when torque in the same direction is applied to the other section; and means extending axially of said sections and tending to prevent axial separation thereof, said means having a portion designed to fail under a lighter load than said predetermined load.

5. A rotary shaft coupling comprising: a pair of sections formed for connection with driving and driven units to transmit motion from the former to the latter, one of said sections having a frangible portion designed to fail under predetermined load; interengaging means on said sections operative to transmit rotary motion from one to the other when torque in one direction is applied to one section and to tend to cause relative axial separation when torque in the same direction is applied to the other section; and means disposed on the axis of rotation of said sections to normally prevent relative axial movement thereof, said means having a portion designed to fail under a lighter load than said predetermined load.

6. A rotary shaft coupling comprising: a pair of sections formed for connection with driving and driven units to transmit motion from the former to the latter, one of said sections having a frangible portion designed to fail under predetermined load; interengaging means on said sections operative to transmit rotary motion from one to the other when torque in one direction is applied to one section and to tend to cause relative axial separation when torque in the same direction is applied to the other section; and means substantially entirely enclosed by said sections and operative to normally prevent relative axial movement thereof, said means having a portion designed to fail under a lighter load than said predetermined load.

7. A rotary shaft coupling comprising: a pair of sections formed for connection with rotary driving and driven units to transmit motion from the former to the latter; interengaging means on said sections operative to transmit rotary motion from one to the other when torque in one direction is applied to one section and to tend to cause relative axial separation when torque in the same direction is applied to the other section; and threaded means extending axially of said coupling and threadedly connected with said sections, the threads on said means and sections being formed to draw said sections together when the threaded means are rotated in one direction relative to said sections, said threaded means having a portion designed to fail under predetermined load.

References Cited in the file of this patent

UNITED STATES PATENTS

| | | |
|---|---|---|
| 1,776,525 | Talbot | Sept. 23, 1930 |
| 2,307,556 | Wileman | Jan. 5, 1943 |
| 2,428,128 | Sheppard | Sept. 30, 1947 |
| 2,438,676 | Nickle et al. | Mar. 30, 1948 |

FOREIGN PATENTS

| | | |
|---|---|---|
| 255,556 | Germany | Jan. 11, 1913 |
| 380,744 | Great Britain | Sept. 22, 1932 |